United States Patent Office 3,393,557
Patented July 23, 1968

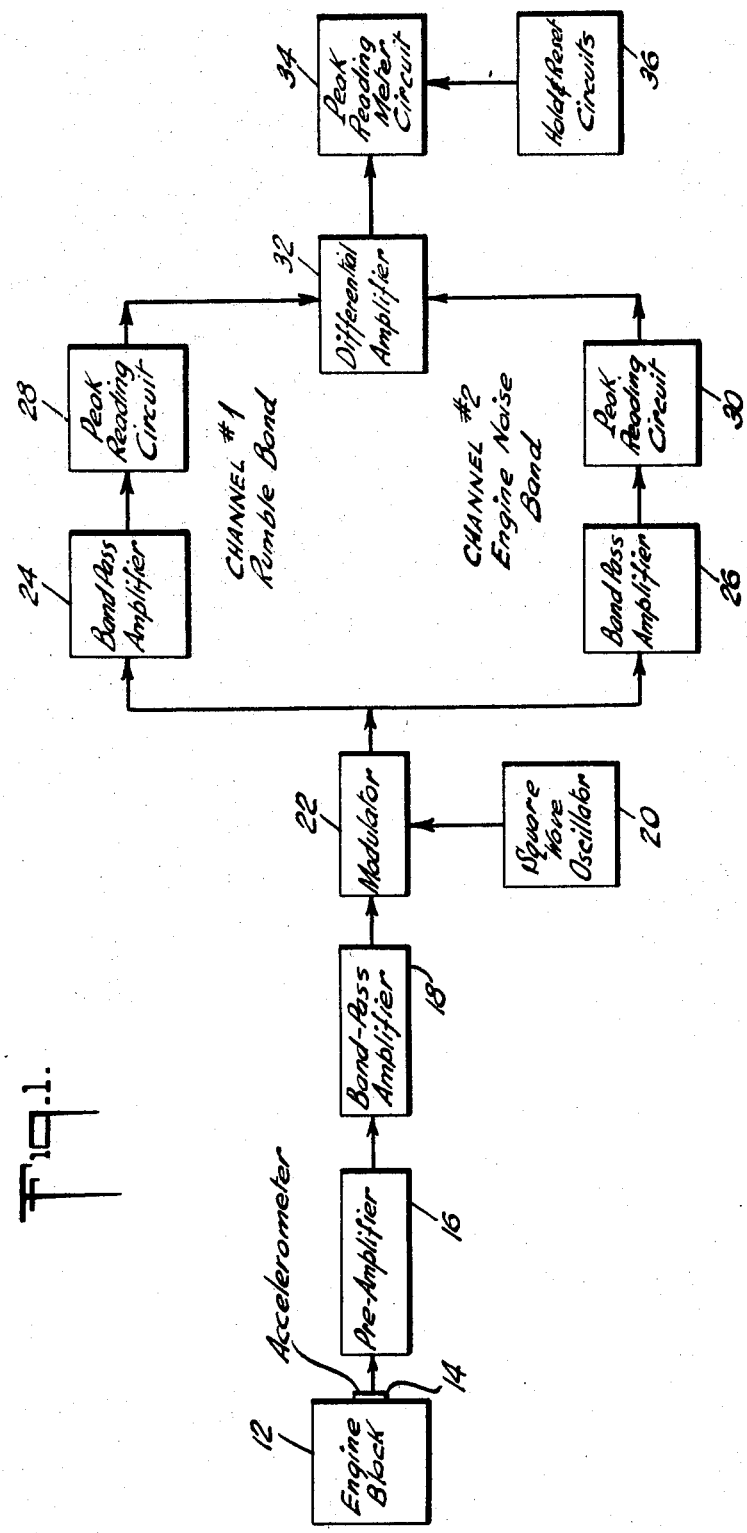

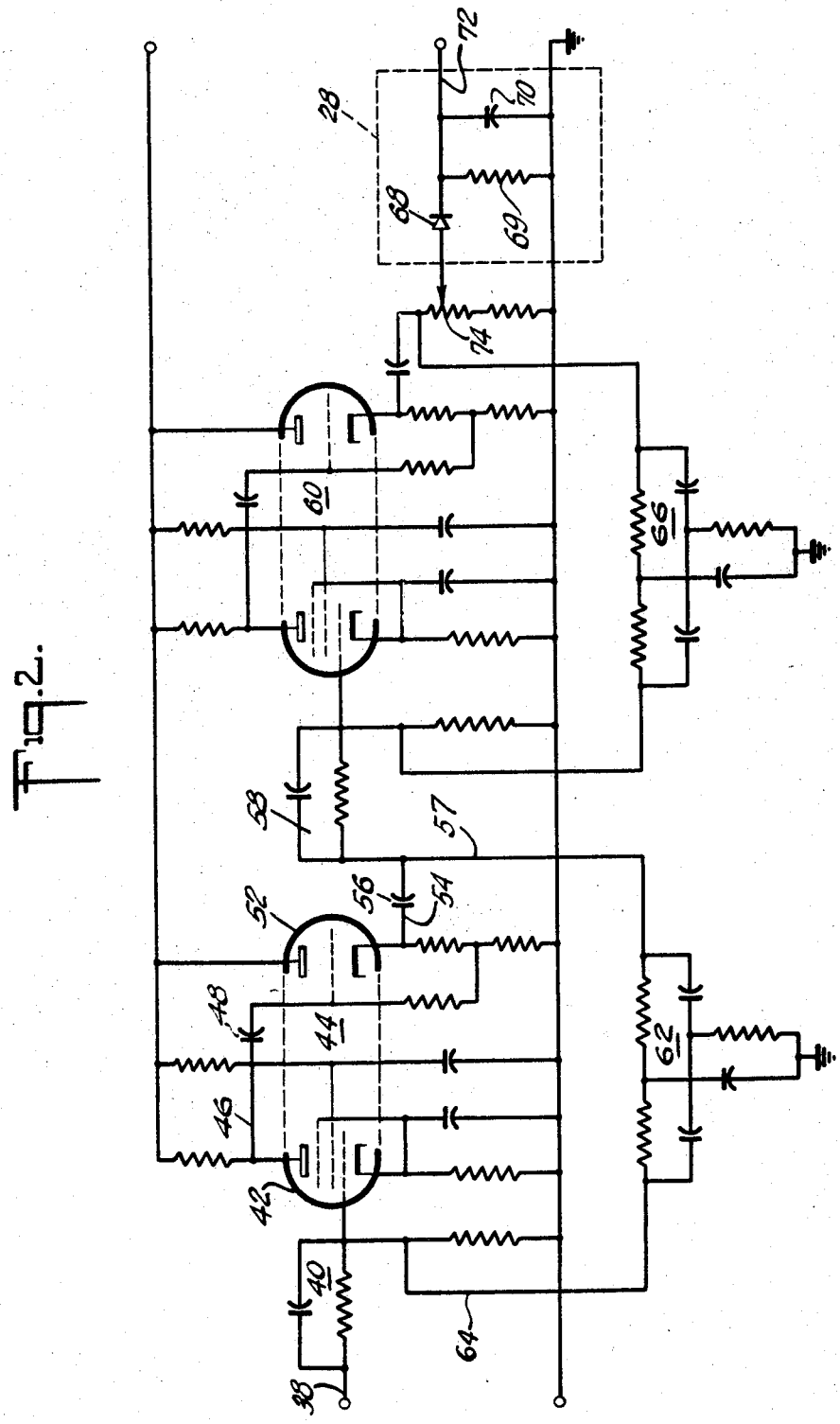

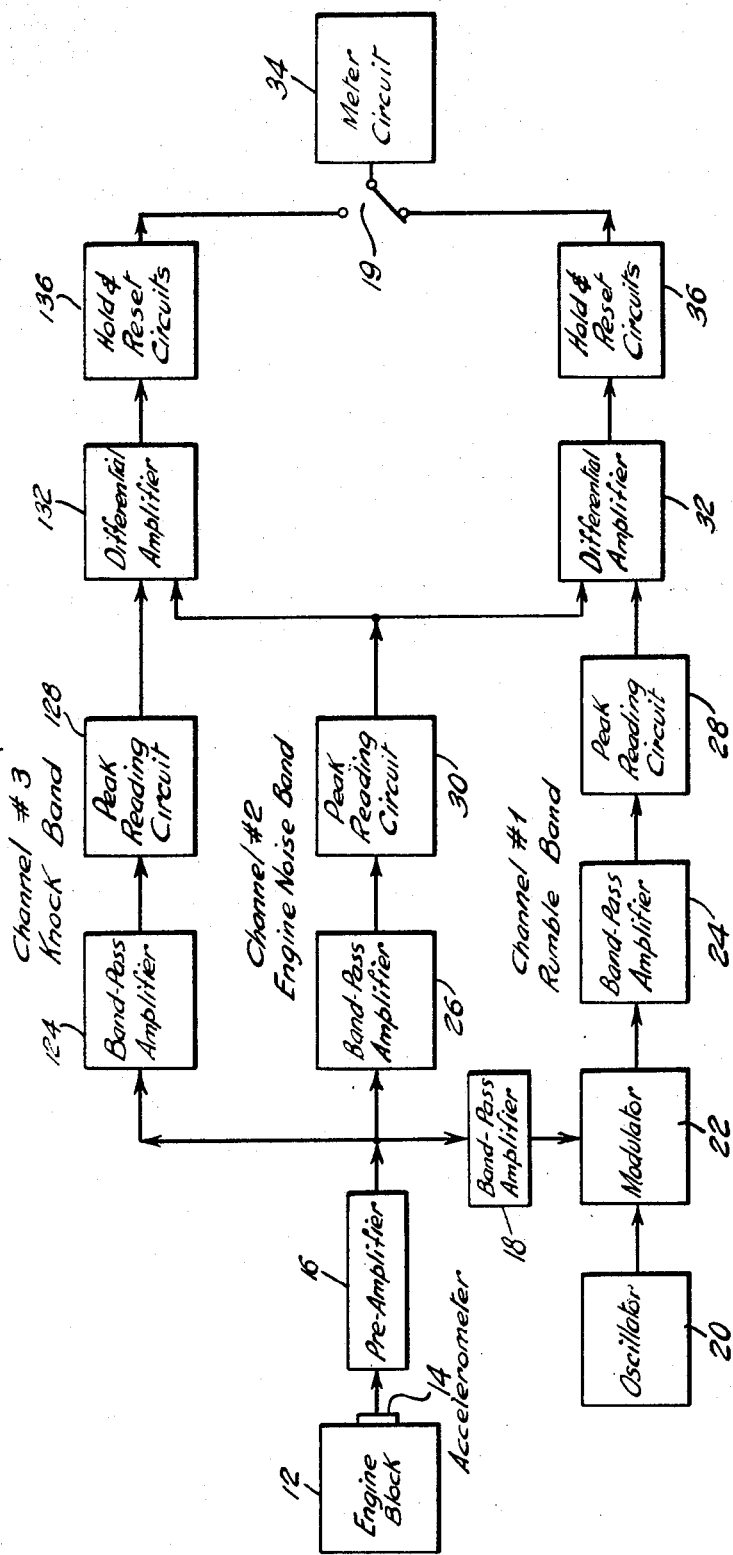

3,393,557
APPARATUS FOR MEASURING SELECTED
ENGINE VIBRATION CHARACTERISTICS
William F. Brown, Wappingers Falls, and Ronald J.
Goetchius, Fishkill, N.Y., assignors to Texaco Inc.,
New York, N.Y., a corporation of Delaware
Continuation-in-part of application Ser. No. 517,252,
Dec. 29, 1965. This application June 29, 1967, Ser.
No. 652,991
13 Claims. (Cl. 73—116)

ABSTRACT OF THE DISCLOSURE

An apparatus for measuring selected engine vibration characteristics comprising a transducer for translating vibrations to electrical signals, having its output connected to a pair of parallel channels each including frequency-selective and peak-reading means, one channel passing signals only of the vibration characteristic of interest and the other channel passing signals of another predetermined frequency, each of the peak-reading means producing a signal proportional to the peak-value of the electrical signal passed therethrough and coupled to a difference measuring means capable of producing a signal proportional to the difference between the peak-values which is utilized in a meter indicative of the amount of the selected vibration characteristics.

This invention is a continuation-in-part of application Ser. No. 517,252, filed on Dec. 29, 1965, and now abandoned.

Background of the invention (1) *Field of the invention.*—This invention relates to an apparatus for measuring a selected engine vibration characteristic such as engine rumble or knock and more particularly to apparatus for detecting rumble or knock or both in gasoline engines during combustion.

(2) *Description of the prior art.*—Engine rumble is a low frequency noise caused by crankshaft vibrations, such as bending or torsional vibrations produced by uneven application of power to torque the crankshaft. Rumble occurs often in gasoline engines and is generally considered to be due to improper combustion caused by carbon deposits in the engine. Considerable difficulty has been encountered in measuring rumble due to its transient nature, that is it occurs usually in short bursts. During engine speed changes such as in acceleration or deceleration, the level of background noise and vibration changes. This adds further difficulty in obtaining a measure of rumble. Previously, rumble in gasoline engines had been measured at a predetermined engine speed by detecting the noise intensity level increases in the rumble frequency range of the engine noise frequency spectrum. Once these intensity level increases are measured, they are assigned values with respect to a reference noise level which is the normal sound intensity in this frequency range due to engine noise when no rumble is present. Rumble measurements determined in this manner are adequate for use in engines operating at constant speed but have proved to be inadequate where engine speed is varying rapidly as in acceleration. During acceleration, for example, the normal engine noise increases in intensity in the frequency range of interest such that an erroneous indication of rumble is obtained where actually no rumble is present.

Engine knock is an audio frequency noise characterized by an audible ping emanating from the engine cylinders. During a no-knock condition, the spark ignites the gases closest to the spark plug and the flame front continues in a wave like manner to combust all the gas in the cylinder from the point of ignition in the cylinder chamber to the furthermost regions of the combustion chamber. During knock conditions the compressed gases in a cylinder of an engine are no longer combusted by a smoothly progressive flame front ignited by a spark from a spark plug.

When the compressed gases at the end of the cylinder away from the spark plug ignite almost instantaneously prior to the arrival of the combusting flame front, ignited by a spark from the spark plug ignition, knock occurs. This knock condition arises as the unburnt portion of the charge is progressively heated, due to the direct heat transfer from the flame and to the compression by the expanded burnt products. Knock conditions then may arise where these fresh gases reach a state of combustion before being ignited by the advancing flame. Under knock conditions, the end gases ignite almost instantaneously, and a violent pressure rise occurs followed by vigorous vibrations not only of the gases but of the material of the combustion chamber itself.

A moderate degree of knock can be tolerated in an automobile engine for a short period but, if extended, will eventually lead to overheating, loss of power, and mechanical damage. With airplane engines, knock could not be detected over the general noise level, and thus cannot be tolerated under any circumstances. If any hot-spots are created in the combustion chamber, as with overheated plugs or exhaust valves, these may themselves act as ignition forces so that auto ignition occurs, leading in turn to perignition. With the former phenomenon, the mixture is ignited independently of the spark but at about the normal timing, and is only detectable by the engine running-on after switching off the electric ignition. Pre-ignition represents a more severe case where ignition occurs before its normal timing, and a very serious condition can quickly be reached.

Knock and preignition can develop from each other, and can both lead to severe damage and engine failure. Damage due to knock is usually noted as piston erosion, the violent pressure waves physically removing particles from the piston crown, whereas preignition failures are observed as piston melting due to the excessive heat.

Since knock places a great deal of stress as well as wear and tear on the piston and other moving parts of the engine much research has been carried on in trying to obtain a simple apparatus capable of detecting the noise intensity level in the knock frequency range of the engine noise frequency spectrum. A further complication is that during engine operation when an unduly heavy work load is placed on the engine such as in accelerating up an incline, the level of background noise and vibration changes. This adds further difficulty in obtaining a measure of knock since the masking background noise frequency and intensity are continually varying.

Apparatus has been heretofore used to measure knock intensity, particularly those recommended by the American Society for Testing Materials. (See, for example, ASTM Manual for Rating Motor Fuels by Motor and Research Methods, Fourth edition, 1960; Published by the American Society for Testing Materials, Philadelphia, Pa.; especially at pages 50 to 51.) However, these prior apparatus are useful only for measuring the octane rating of fuels. The apparatus described here is intended primarily for measurement of fuel octane requirement of gasoline engines although it is adaptable as well to the measurement of fuel octane.

Summary of the invention

Accordingly, it is the main object of the present invention to provide a method and apparatus for measuring selected engine vibration characteristics in the presence of varying background noise and vibration.

It is another object of the present invention to provide a method and apparatus for measuring engine knock or rumble in the presence of varying background noise and vibration.

It is a further object of the present invention to provide apparatus capable of measuring and displaying the peak intensity of knock or rumble emanating from a variable speed gasoline engine.

It is still another object of the present invention to provide apparatus capable of measuring engine knock or rumble in which the gain and band width of the apparatus can be easily adjusted for adapting the apparatus to engines having different characteristics.

According to the present invention, the apparatus for measuring a selected vibration characteristic of an engine such as rumble or knock comprises a transducer means for converting engine vibrations into corresponding electrical signal variations which are applied to a first and second channel connected in parallel. Each channel includes a frequency-selective means and a peak-reading means. One of the frequency-selective means passes the electrical signals falling within the predetermined selected vibration characteristic frequency range while the other frequency-selective means passes the electrical signals from a second predetermined engine vibration frequency range. The peak-reading means in each channel produces a signal proportional to the peak-value of the electrical signals passed by the associated frequency-selective means. Subtracting means are provided for producing a difference signal proportional to the difference between the peak-value signal derived from the peak-reading circuits of the respective channels. This difference signal is indicative of the amount of selected vibration characteristic produced by the engine.

The above-mentioned and other features and objectives of this invention and the manner of obtaining them will become more apparent and the invention itself will be best understood by reference to the following descriptions of an embodiment of the invention taken in conjunction with the accompanying drawings wherein:

*Brief description of the drawings*

FIG. 1 is a schematic block diagram of the apparatus for measuring engine rumble;

FIG. 2 is a schematic circuit diagram of the band pass amplifier and the peak reading circuit of the rumble or knock passing channel; and FIG. 3 is a schematic block diagram of the apparatus for selectively measuring either engine knock or engine rumble.

*Description of the preferred embodiments*

Before mechanizing the instant invention, it is necessary to determine the frequency range in which the rumble or knock noise occurs and other frequency characteristics of the type engine of interest in order to determine the frequency-selective characteristics of the bandpass amplifiers in the channels. This is accomplished by a frequency analysis of the engine vibrations during rumbling and non-rumbling operations as well as knocking and non-knocking operations, which consists of utilizing the accelerometer or other pick-up means to convert the engine vibrations into corresponding electrical signals which may be recorded or otherwise utilized so as to determine therefrom the frequency range in which the rumble noise occurs and the frequency range in which the knock noise occurs and the frequency ranges which are unaffected by knock or rumble. The gain of channels can be easily adjusted by measuring, with the apparatus of the instant invention, the noise characteristics of the engine when no rumble is present and then when no knock is present. Under such a condition each channel can be adjusted for gain such that the output signal from each channel is of the same amplitude.

The frequency analysis should be performed over the 60 to 1,600 cycles per second (c.p.s.) range which has been determined to be the principal range in which the frequency of the rumble phenomenon lie. It has been determined that there is a marked increase in noise amplitude in the 850 to 1250 c.p.s. frequency range compared to that observed when no rumble was detected. This later frequency range will hereafter be referred to as the rumble band. The engine noise band range for rumble measurement has been selected as the 400 to 700 c.p.s. frequency band where strong resonant modes due to engine vibration exist which are unaffected by rumble. This 400 to 700 c.p.s. frequency band will hereafter be referred to as the first engine noise band. However, this first engine noise band can include other bandwidths which are unaffected by the particular selected engine vibration characteristic.

A typical illustration of frequencies found on an analysis performed over the 600 to 8000 c.p.s. range on a 1966 Ford V-8 engine, while analyzing for a distant knock band indicated a marked increase in noise amplitude in various areas of bandwith such as the 1600 to 2700 c.p.s. frequency range, and the 4600 to 5600 c.p.s. band range compared to that observed when no-knock was detected. Additionally, the 2700 to 3700 c.p.s. area varied but slightly with knock as well as rumble intensity; in an embodiment of a typical meter this region can be used for the reference measurement channel for both rumble and knock. It is to be understood however, that any convenient bandwith can be used within this region as a reference channel.

The 1600 to 2700 c.p.s. frequency range is close to the rumble range of 850 to 1250 c.p.s., therefore, since the higher frequency range of 4600 to 5600 c.p.s. is available this higher frequency range is preferred and will be referred to as the knock-frequency band. It is to be understood that while this frequency range is a preferred range, other suitable frequency ranges may be used as the knock frequency band.

The preferred engine noise band range for the knock frequency detection has been selected as the 2700 to 3700 c.p.s. frequency band which is unaffected by knock or rumble. This preferred 2700 to 3700 c.p.s. frequency band will hereafter be designated as the second engine noise band but it will be understood that other bandwidths unaffected by knock will be comprehended by this designation.

Referring to FIG. 1, the engine under observation is preferably a gasoline engine. A transducer means such as an accelerometer 14 is attached as convenient to the engine block. For rumble measurements this is preferably adjacent to the crankshaft rear center main bearing support. For knock measurements other placements are just as convenient, e.g. adjacent spark plug openings. It will be appreciated that the same purpose can be achieved using a microphone adjacent the engine rather than an accelerometer. The accelerometer may be of the piezoelectric type in which the bending of a crystal under acceleration produces an electrical charge or current which is linearly proportional to the applied acceleration. The output of the accelerometer is the eletcrical equivalent to the rate of change of the engine block vibration over a frequency range determined by the frequency response characteristics of the accelerometer and its associated circuitry. An example of a suitable accelerometer is the Columbia Research Laboratories 504–2HT which has a nominal sensitivity of 50 mv./g. and capacitance of 25 picofarads including connecting cable capacitance and a flat frequency response from 100 cycles per second to 10,000 c.p.s. when operated into a 6 megohm load which is provided by the preamplifier 16. In addition, the preamplifier 16 acts as a low impedance source to drive the cable which connects the preamplifier accelerometer combination at the engine to the rest of the apparatus which is located remotely. To protect against electrical pickup caused by the engine ignition system interfering with the rumble or knock measuring apparatus, the cables connecting the accelerometer, the preamplifier and the rest of the equipment are run through metal conduit and the preamplifier itself is enclosed in a metal case; shielded coaxial cable does not provide adequate protection against this interference in this application. The electrical signals upon arriving at the remote location are amplified by a conventional band-pass amplifier 18 which is preset to pass the frequencies from 300 to 1500 c.p.s. This amplifier has a pass-band voltage gain which is adjustable from 0 to 45 and employs resistance-capacitance filters in its input and output circuits to achieve a frequency response roll-off of six decibels per octave at the low and high frequency cut-off points. The band limiting provided by this amplifier 18 serves the purpose of eliminating the overlap of harmonic side-band frequencies generated in the amplitude modulator 22 connected thereto. The resulting signal at the output of the band-pass amplifier 18 modulates a 4 kc./s. square wave carrier signal generated by a tuning fork oscillator 20. The net effect of the modulator is to shift the information in the input signal to frequency side bands at the odd harmonics of the 4 kc./s. carrier signal; the information carried by the vibration signal is retained in any one of the side bands and may be recovered through the use of appropriate band-pass filters. The modulation or the frequency transformation provided thereby permits the use of less elaborate filters in the subsequent frequency selective amplifiers. Actually the modulator is a voltage control switch actuated at a 4000 c.p.s. rate by the square wave oscillator 20 such that a product relationship is formed between the input vibration signal and the switching signal. The resultant output from the modulator is a single ended amplitude modulated 4000 c.p.s. square wave.

As mentioned previously the rumble lies generally in the frequency band range of 850 to 1250 c.p.s. while the original first engine noise band range extends from 400 to 700 c.p.s. In the transformer or modulated signal, the frequencies corresponding to the rumble lie in the 4850 to 5250 c.p.s. band while the original engine noise band is shifted to the 4400 to 4700 c.p.s. band. As shown in FIGURE 1, the band-pass amplifiers 24 and 26 in channels 1 and 2, respectively correspond to these frequency bands in the preferred embodiment for measuring rumble. Each of the band-pass amplifiers consists of two stagger-tuned frequency selective amplifiers which employ twin-T frequency rejection networks in a negative feed back configuration to generate the desired frequency response characteristics for each channel. In each of channels 1 and 2 of FIGURE 1, corresponding respectively to the rumble band and the reference or engine noise band, there is a peak reading circuit, 28 and 30, respectively. These peak reading circuits each consist of a rectifier circuit at the output of each band-pass amplifier which produces a DC signal proportional to the amplitude of the signal in each channel. In this way an analog signal is generated in each channel, one analog signal being characteristic of the combined rumble and engine vibration intensities (channel 1) a second being characteristic of the engine vibration intensity alone (channel 2). These analog signals from the first and second channels are then applied to a conventional differential amplifier 32 which provides an output signal proportional to the difference between the two analog input signals of channels 1 and 2. The peak value of this net difference signal from differential amplifier 32 is detected and displayed by a conventional peak reading meter circuit 34, the display being held until reset in order to facilitate recording of the resultant meter reading by the operator. Hold and reset circuit 36 is provided for this purpose. This difference signal from the differential amplifier 32 represents the rumble present in the engine since the engine noise which was present in both channels (i.e. channel 1 and 2) was cancelled in the differential amplifier leaving only that noise produced by the rumble.

The particular differential amplifier utilized has a differential voltage gain of 10 and a common mode rejection of about 100 which, in practice, provided reasonably large signals at the differential amplifier output when rumble or knock was present and nearly perfect cancellation of the engine acceleration when neither rumble nor knock was present.

A further embodiment of this invention is depicted in block diagram in FIGURE 3 and includes beside channels 1 and 2 of the rumble meter, channel 3 which is a knock hand. In FIGURES 1 and 3, similar apparatus have been given the same reference numerals. A switch means 19 such as a single pole, double throw switch is shown, by which the meter can be used to detect rumble, using channels 1 and 2, in a first switch position and knock, using channels 2 and 3, in a second switch position. The noise band, channel 2, is the same for both rumble and knock detection.

As described above in connection with FIGURE 1, a frequency analysis was performed for a typical example over the 600 to 8000 c.p.s. range on a 1966 Ford V-8 engine.

The preferred knock frequency band in this example is selected as 4600 to 5600 c.p.s. and the preferred second engine noise band range, for the embodiment depicted in FIGURE 3, is selected as the 2700 to 3700 c.p.s. frequency band.

When the switch means 19 of FIGURE 3 is switched to the rumble detection position, the instrumentation is the same as that described above for FIGURE 1. However, when the switch means 19 is placed in the knock detection position, additional circuitry follows the preamplifier 16. The band pass amplifier 124 in channel 3 is preset to pass frequency band of 4600 to 5600 c.p.s., which has been referred to above as the preselected knock frequency band for this example. The output of band pass amplifier 124, which consists of two stager tuned frequency selective amplifiers similar to band pass amplifiers 24 and 26 respectively in channels 1 and 2 as described above, is passed to peak reading circuit 128. Peak reading circuit 128 is similar to peak reading circuits 28 and 30 of channels 1 and 2 respectively. The analog signal from the second and third channels are then applied to a conventional differential amplifier 132 which provides an output signal proportional to the difference between the two analog input signals of channels 2 and 3. The output of differential amplifier 132 in turn provides an output signal which is detected and displayed by the peak reading meter circuit 34 similar to the meter circuit in the first embodiment illustrated in FIGURE 1 and described above. Differential amplifier 132 is similar to differential amplifier 32 in channel 1. Hold and reset circuits 136 are provided to hold the display on meter circuit 134 until reset. The different signal from the differential amplifier 132 represents the knock present in the engine noise which was present in both channels (i.e. channels 2 and 3) is cancelled in the differential amplifier 132 leaving only that noise produced by the knock.

Referring to FIGURE 2, there is shown an example of the circuitry which can be utilized for band-pass amplifier 24 and peak reading circuit 28 of the rumble band, channel 1. The circuits in channels 2 and 3 substantially correspond to those in channel 1 except for the values of some of the components utilized and, thus, only the details of the one channel are shown. For rumble, when the frequency is below 2000 c.p.s., the band-pass amplifier 24 receives the amplitude modulated waves from modulator 22 over electrical connection 38 which contains an RC coupling network 40 which is connected to the control grid of pentode tube 42 of AC amplifier stage 44 (see FIGURES 1, 2 and 3). The amplified output of the pentode tube 42 of amplifier stage 44 is taken from the plate circuit over lead 46 containing capacitor 48 which is connected to the control grid of triode tube 52 of amplifier stage 44. Triode 52 serves as a cathode follower with the output thereof connected over conducting lead 54, containing capacitor 56 to RC coupling network 58 of amplifier stage 60. Amplifier stage 60 is an exact replica of amplifier stage 44. As can be seen these stages are connected in series. Each of amplifier stages 44 and 60 has what is popularly known as a twin-T frequency rejection network connected as a negative feedback circuit. The feedback circuit extends from output lead 54 of amplifier stage 44 via lead 57 which connects to one side of the associated frequency rejection network 62, the output of which is connected via lead 64 to the control grid of pentode tube 42 of amplifier stage 44. The frequency rejection network is arranged to reject, that is attenuate, the desired frequencies and pass all others such that all other frequencies are cancelled by the negative feedback except those that are rejected by the frequency rejection network in the feedback path. The second amplifier stage 60 is exactly the same as amplifier stage 44 except for the components in the frequency rejection network 66 in the feedback path which is arranged to reject different frequencies than those rejected by frequency rejection network 62. Accordingly, each amplifier stage with its frequency dependent feedback network represents a singly tuned circuit with a response characteristic centered about a frequency determined by the twin-T components and a selectively (band center to band width ratio) determined by the amplifier gain without feedback. Through appropriate stagger-tuning of the frequency selective amplifier pair in each channel, a channel frequency response characteristic flat to within one decibel in the pass-band with a high rate of response roll-off on either side of the pass-band was achieved. In the instant application, the required selectivity for each frequency selective amplifier was approximately 20 and an insertion gain of about 15 db was obtained for each channel.

The peak reading circuit 28 is also shown in FIG. 2 which consists of a silicon diode 68 and a low pass filter connected to the output of amplifier stage 60. The low pass filter consists of a parallel connected 100K resistor 69 and a 1 microfarad condenser 70. This arrangement generates a DC signal proportional to the amplitude of the signal passed by the associated band-pass amplifier. The output lead 72 from the peak reading circuit is connected to the differential amplifier 32.

The output of the rumble noise channel 1 or the knock noise channel 3 may be adjusted by means of the potentiometer 74 shown before the peak reading circuit 28 at the output of amplifier stages 60 in FIG. 2. This adjustment is utilized to match the non-rumble or non-knock noise respectively in the rumble or knock channel to the noise in the engine noise channel so that these background and engine induced noises will exactly cancel in the differential amplifier. This matching is done prior to making the rumble or knock measurement, at a time when there is no rumble or knock present. Effectively, the adjustment of the potentiometer adjusts the gain of the channel.

It has been found that most automotive gasoline engines of the same type exhibit similar vibration patterns because of the structural similarities, especially with respect to the crankshaft which is the principal rumble noise source. However, it can be expected that due to slight difference in physical configuration, engines of different types may have vibration modes which differ slightly in frequency from those set forth above. As a result, this rumble or knock measurement system may be adjusted to operate with practically all engine types by returning and recalibrating in accordance with the vibration frequency analysis previously described to select the appropriate rumble or knock and engine noise channels for each engine type involved.

We claim:

1. Apparatus for measuring a selected engine vibration characteristic comprising transducer means for converting engine vibrations related to said characteristic into corresponding electrical signal variations, a pair of channels connected in parallel to said transducer means for receiving said electrical signal variations, each channel including a frequency-selective means and a peak-reading means, one of said frequency-selective means passing said electrical signals falling within a predetermined rumble frequency range, the other of said frequency-selective means passing said electrical signals falling within a predetermined engine vibration frequency range different than said rumble frequency range, said peak-reading means in each channel producing a signal proportional to the peak-value of the electrical signals passed by said associated frequency-selective means, difference measuring means coupled to both channels for producing a difference signal proportional to the difference between the peak-value signal derived from the peak-reading means of the respective channels and utilization means for utilizing said difference signal which is indicative of the amount of said characteristic vibration produced by said engine.

2. Apparatus according to claim 1, wherein each of said frequency-selective means comprises a pair of AC amplifier stages each having a frequency rejection network in a negative feedback path, said amplifier stages and frequency rejection networks being tuned to establish a predetermined frequency pass-band.

3. Apparatus according to claim 1, wherein said utilization device comprises a peak-reading meter and hold circuit for indicating the peak-value of the difference signal obtained from the difference measuring means and holding said value a predetermined time.

4. Apparatus according to claim 1, wherein said peak-reading means comprises a diode biased in the forward direction and an RC low-pass filter network connected to said diode to produce a DC signal proportional to the peak amplitude of the signals passed by said respective frequency-selective means.

5. Apparatus according to claim 1, wherein the selected engine characteristic is engine rumble, wherein said frequency-selective means in said one channel passes electrical signals in said predetermined frequency range extending substantially between 850 and 1250 cycles per second and said frequency-selective means in said other channel passes electrical signals in said predetermined engine vibration frequency range extending substantially between 400 and 700 cycles per second.

6. Apparatus according to claim 1, further comprising means for adjusting the gain in at least one of said channels so that the signals passed thereby due to engine vibration exclusive of rumble can be adjusted to substantially cancel in the difference measuring means.

7. Apparatus for measuring the rumble in engines according to claim 1, wherein said electrical signals derived from said transducer means are connected to an amplifier means having a predetermined band-pass characteristic, a fixed frequency oscillator for generating fixed frequency signals and modulation means connected to said amplifier means such that the electric signals passed by said amplifier means modulate said fixed frequency signal wave in said modulator to produce a modulated output wave.

8. Apparatus according to claim 7, wherein the selected engine characteristic is engine rumble, wherein, the frequency of said fixed frequency oscillator is substantially 4000 cycles per second and the frequency band predetermined by said frequency selective means in said one channel extends substantially between 4850 and 5250 cycles per second, and the frequency band predetermined by said frequency selective means in said other channel extends substantially between 4400 and 4700 cycles per second.

9. Apparatus for measuring rumble in engines comprising transducer means for transforming vibrations of the engine into corresponding electrical signals, a pair of parallel channels connected to said transducer means to receive the electrical signals, a band-pass amplifier and a peak-reading circuit connected in each of said channels, said band-pass amplifier in each channel being set to amplify and pass only signal frequencies lying within different predetermined frequency ranges, the one predetermined frequency range including most of the rumble frequencies as well as the engine vibration frequencies falling within the rumble frequency range, the other band-pass amplifier frequency range including engine vibration frequencies different than the rumble frequencies, the peak-reading circuit in each channel providing an analog signal proportional to the peak amplitude of the electrical signals passed by the band-pass amplifier in its respective channel, a differential amplifier connected to both of said channels to receive said analog signals and produce a signal output which is proportional to the difference between the received analog signals, said engine vibration frequencies exclusive of the rumble frequencies cancelling in said differential amplifier leaving the output of said differential amplifier proportional to the rumble, and a peak-reading meter and a hold and reset circuit connected to said differential amplifier for measuring the peak of said rumble output.

10. Apparatus for measuring knock in engines comprising transducer means for tarnsforming vibrations of the engine into corresponding electrical signals, a pair of parallel channels connected to said transducer means to receive the electrical signals, a band-pass amplifier and a peak-reading circuit connected in each of said channels, said band-pass amplifier in each channel being set to amplify and pass only signal frequencies lying within different predetermined frequency ranges, the one predetermined frequency range including most of the knock frequencies as well as the engine vibration frequencies falling within the knock frequency range, the other band-pass amplifier frequency range including engine vibration frequencies different than the knock frequencies, the peak-reading circuit in each channel providing an analog signal proportional to the peak amplitude of the electrical signals passed by the band-pass amplifier in its respective channel, a differential amplifier connected to both of said channels to receive said analog signals and produce a signal output which is proportional to the difference between the received analog signals, said engine vibration frequencies exclusive of the knock frequencies cancelling in said differential amplifier leaving the output of said differential amplifier proportional to the knock, and a peak-reading meter and a hold and reset circuit connected to said differential amplifier for measuring the peak of said knock output.

11. Apparatus according to claim 10, wherein said frequency-selective means in said one channel passes electrical signals in said predetermined knock frequency range extending substantially between 4600 and 5600 cycles per second and said frequency-selective means in said other channel passes electrical signals in said predetermined engine vibration frequency range extending substantially between 2700 and 3700 cycles per second.

12. Apparatus according to claim 10, wherein said frequency-selective means in said one channel passes electrical signals in said predetermined knock frequency range extending substantially between 1600 and 2700 cycles per second and said frequency-selective means in said other channel passes electrical signals in said predetermined engine vibration frequency range extending substantially between 2700 and 3700 cycles per second.

13. Apparatus for measuring rumble and knock in engines comprising transducer means for transforming vibrations of the engine into corresponding electrical signals, three parallel channels connected to said transducer means to receive the electrical signals, a band-pass amplifier and a peak-reading circuit connected in each of said channels, said band-pass amplifier in each channel being set to amplify and pass only signal frequencies lying within different predetermined frequency ranges, the first predetermined frequency range in the first channel including most of the rumble frequencies as well as the engine vibration frequencies falling within the rumble frequency range, the second predetermined frequency range in the second channel including most of the knock frequencies as well as the engine vibration frequencies falling within the knock frequency range, and the third band-pass amplifier frequency range in the third channel including engine vibration frequencies different than the rumble and knock frequencies, the peak-reading circuit in each channel providing an analog signal proportional to the peak amplitude of the electrical signals passed by the band-pass amplifier in its respective channel, a first differential amplifier connected to the output of said first and third channels to receive said analog signals therefrom and produce a signal which is proportional to the difference between the received analog signals, a second differential amplifier connected to the output of said second and third channels to receive said analog signals therefrom and produce a signal output which is proportional to the difference between the received analog signals, said engine vibration frequencies exclusive of the rumble frequencies cancelling in said first differential amplifier leaving the output of said first differential amplifier proportional to the rumble, said engine vibration frequencies exclusive of the knock frequencies cancelling in said second differential amplifier leaving the output of said second differential amplifier proportional to the knock, a first hold and reset circuit connected to said first differential amplifier, a second hold and reset circuit connected to said second differential amplifier, a switch means for selecting either said first or second hold and reset circuit and a peak-reading meter for measuring the peak of said rumble or knock output.

References Cited
UNITED STATES PATENTS

| | | | |
|---|---|---|---|
| 2,679,746 | 6/1954 | DeBoisblanc | 73—35 |
| 3,024,312 | 3/1962 | Daguet | 332—40 X |
| 3,183,708 | 5/1965 | Roddick | 73—35 |

RICHARD C. QUEISSER, *Primary Examiner.*

J. W. MYRACLE, *Assistant Examiner.*